March 8, 1960

H. B. UHL 2,927,987

LEVEL SWITCHES

Filed Feb. 12, 1959

INVENTOR.
HERBERT B. UHL

BY

ATTORNEY.

United States Patent Office 2,927,987
Patented Mar. 8, 1960

2,927,987

LEVEL SWITCHES

Herbert Bennett Uhl, River Edge, N.J.

Application February 12, 1959, Serial No. 792,898

5 Claims. (Cl. 200—152)

This invention relates to improved level switches.

Level switches, that is to say switches in the form of a level containing a gas bubble in a liquid and a number of electrodes, are used extensively for the erection of gyrocompasses. The switches present a number of problems. Ordinary tilting switches using mercury as a conducting liquid are not usable as this is a pure on and off switch and cannot provide varying resistances near the center point which are necessary for the satisfactory operation of erecting devices for gyrocompasses and similar uses.

While the control of erecting devices for gyrocompasses represents an important field for the present invention, it should be understood that the invention is in no sense limited thereto and solves the problem of level switches in other uses, particularly where the switch operates frequently. Examples of such uses are shipboard instruments, instruments for submarines, oil well drilling instruments where the problem of maintaining a perpendicular hole or a hole with a predetermined slant is serious. Similarly, in mines the problem of maintaining an accurate alignment of shafts also occurs. The invention may also be used for other instruments, such as surveying instruments where the problem is not quite as serious as the switches do not operate as frequently.

One type of switch uses a liquid which has ionizing properties and has dissolved in it an ionizable compound, such as a salt, to form an electrolyte. The switch body, usually of glass, is curved as a carpenter's level and is provided with a gas bubble. The gas may be air or an inert gas, such as nitrogen, argon or helium. The most obvious liquid to use is a solution of a salt in water. An electrolyte results which can be of any desired conductivity, depending on the amount of the dissolved salt. It is cheap and has adequately low vapor pressure which is an important factor as the equipment is often used in airplanes and in places where there may be temperatures considerably above ordinary room temperature. Water alone as an ionizing solvent is not practical because it is subject to freezing and the switch, particularly in airplane use, will normally be exposed to temperatures below freezing at times during its life. This difficulty was overcome by using anti-freeze chemicals, such as alcohols. Any alcohol was usable provided that it formed a sufficiently fluid solution at low temperatures. Excessive viscosity is, of course, undesirable in a sensitive switch which must respond to changed inclinations rapidly. For practical purposes, methanol and ethanol were used. The dissolved salt was usually an alkali metal halide and preferably an alkali metal iodide, such as sodium or potassium iodide, because of their higher solubility and because of their lower degree of corrosiveness on the electrodes. In fact, it has even been proposed to plate the electrodes with platinum iodide. Other ionizing solvents can, of course, be used but the high ionizing power and adequately low vapor pressure of aqueous alcohol salt solutions seemed at first to be ideal.

In prolonged operation, an unexpected difficulty arose. The constant variations in electrode liquid contact at a point near balance, which is the point at which the switch normally operates for most of the time, produces electrolysis of the solvent. This was realized to be serious with direct current and even with very low frequency alternating current but it was thought that 400 cycles, which was normally used, would cause no decomposition. It is quite true that no decomposition is visibly evident. However, this led to a false conclusion because actually there is a very small amount of hydrolysis of water producing hydrogen and oxygen. The oxygen reacts with the iodide to produce an iodate and so does not change the appearance of the liquid. The hydrogen, however, accumulates and gradually builds up over hundreds of hours of use a higher and higher gas pressure. When the gas pressure reaches 350 to 400 pounds, the switch body shatters and, of course, the whole gyroscopic equipment is thrown out of operation.

It is possible to use anhydrous ionizing solvents but the only one suitable from the standpoint of vapor pressure had very weak ionizing power. While they can be used in certain cases, they still leave much to be desired.

The present invention solves completely the problem presented with switches having an electrolyte which includes a component which is electrolyzed to hydrogen and oxygen, and very particularly to the excellent cheap electrolytes which contain some water. The solution presented by the invention is, of course, just as applicable to electrolytes containing components other than water which electrolyze to hydrogen and oxygen and so cause the building up of hydrogen gas.

According to the present invention, there is incorporated into the switch liquid a substantial amount of a hydrogen acceptor which is capable of ready reaction with hydrogen. While the hydrogen acceptor can be organic or inorganic and may be liquid or solid, it is advantageous to use an unsaturated organic solvent because there is no problem with large amounts of solid material in the switch and the organic solvent, which will be normally missible with water, performs a dual function. Not only it is a hydrogen acceptor but it confers additional anti-freeze properties when the electrolyte is aqueous. Therefore, while the present invention in its broader aspects includes any hydrogen acceptor, unsaturated organic solvents are preferred. When an unsaturated organic solvent is used as a hydrogen acceptor, there is also included a very small amount of an active hydrogenation catalyst, particularly a catalyst of the platinum metal group, such as platinum, palladium and the like, for example in sponge form or some of the active nickel catalysts. While it is not necessary to have a large amount of catalyst, it is essential that the catalytic element or elements be present in a form in which they will actually behave as a catalyst, that is to say a form in which they expose an enormous specific surface area to the liquid. For example, platinum electrodes or electrodes coated with platinum iodide do not exert any useful catalytic function at all. The catalyst must have the metal in a sufficiently finely divided or extended form in order to be an actual catalyst. The amount of catalyst can be quite small because hydrogen evolution is extremely slow and therefore the large amounts of hydrogenation catalysts which are customarily used in high speed commercial hydrogenations are not in any way necessary. The evolved hydrogen gradually unites with the unsaturated organic compound, transforming it into a saturated one, and there is no rise in hydrogen pressure, even after thousands of hours of operation.

The preferred form of the present invention in which the unsaturated organic compound is used with a hydrogenation catalyst has one other advantage. The electrolysis produces hydrogen and oxygen and hydrogenation catalysts also catalyze to some extent the reaction of hydrogen and oxygen, although they do not catalyze this reaction to as great an extent as they do the hydrogenation reaction with the unsaturated organic compound. To the extent that the catalyst results in a recombination of a portion of the hydrogen and oxygen gases evolved by electrolysis, the switch life is still further increased because as has been pointed out before, no matter how much hydrogen acceptor there is, finally the oxygen reaction with the halide salt constitutes a limitation. The action of the hydrogenation catalyst in recombining a small portion of the hydrogen and oxygen increases to that extent the ultimate switch life.

The particular unsaturated compound to be used is not especially critical provided that it meets the requirements of adequate chemical stability, except for hydrogenation, compatibility with the ionizing solvent mixture, suitably low vapor pressure and viscosity. Otherwise the exact chemical constitution of the unsaturated compound is a matter of complete indifference. For use with aqueous alcoholic electrolytes, the lower unsaturated alcohols are very suitable, allyl and methallyl alcohols giving excellent results, the former being preferred.

The amount of the unsaturated compound is not critical, although obviously, of course, mere traces are without practical utility as they would be used up before a satisfactory life for the switch had been completed. As little as 5% of the liquid gives improved switch life but somewhat more is advantageous. 20% of allyl alcohol in an electrolyte protects against hydrogen pressure for fifteen to twenty thousand hours or more and in general it is not necessary to use larger proportions, although they do no harm. As a matter of fact, there is no point in using more unsaturated compound than is stoichiometrically equivalent to the iodide for, of course, after all of the iodide is used up, there is no oxygen acceptor left and in general, there is no point in having a much larger amount of an unsaturated compound which is the hydrogen acceptor.

The invention will be described in greater detail in conjunction with the drawing in which.

Figure 1:
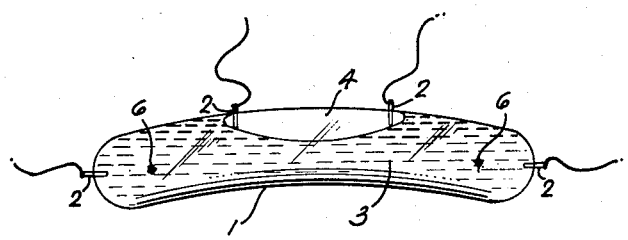
Fig. 1 is a vertical section through the switch in the level position.

The switch consists of a hollow body 1, usually of glass, curved and partly filled with an electrolyte solution 3 containing 20% allyl alcohol, 65% methyl alcohol, 9.5% water and 5% potassium iodide. The electrolyte contains a small amount of spongy platinum catalyst 6 and there are four electrodes 2. The two top electrodes of Fig. 1 project into the bubble 4 of inert gas. The other two electrodes contact the solution. The solution also contains suspended small portion 6 of a platinum sponge catalyst.

In operation, when the switch is in its normal or level position, the two top electrodes 2 are out of contact with the solution and therefore the leads from the left hand and right hand electrodes do not complete a circuit. These leads lead to electric motors (not shown), fed by a source of 400 cycle alternating current of about 20 volts. At the balanced condition, no current flows and the motors therefore do not operate.

Figure 2:
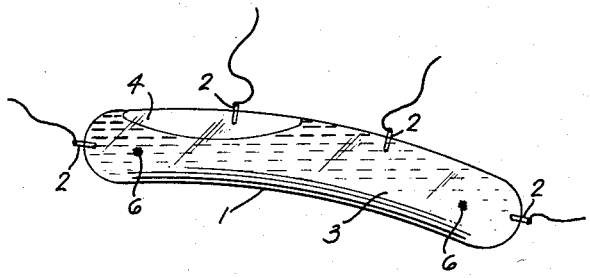
Fig. 2 is a vertical section through the switch in tilted position.

When the switch is tilted, as is shown in Fig. 2, one of the top electrodes is in contact with the electrolyte and current flows through its circuit. This causes the motor to operate in a direction to restore the switch to balance. In order to prevent hunting, the upper electrodes have surfaces of fair size and as balance is approached, a smaller surface of the electrode which was submerged in Fig. 2 is in contact with the electrolyte. The resistance increases, the motor turns more slowly and finally when the level position of the switch is once more reached, the motor stops. When a correcting motor is operated at full power, it may draw, for example, about 50 milliamperes and the current decreases as balance is approached, thus preventing hunting. In the drawings, a simple metallic electrode is shown for clarity of illustration. The particular nature of an electrode material and its shape form no part of the present invention and the same improved results are obtainable with other types of electrodes, such as carbon electrodes.

A small amount of electrolysis takes place forming hydrogen and oxygen. The oxygen unites with the potassium iodide and the hydrogen gradually reacts with the allyl alcohol in contact with the small amount of platinum sponge hydrogenation catalyst. Both gases are therefore reacted and do not add to the volume of the gas bubble and hence do not produce excessive pressures.

Four electrodes are shown in the drawings but it should be understood that the switch may have any number of electrodes depending on the operation it is to perform. For example, three electrodes, one of them permanently submerged, could be used instead of four to feed two correcting motors. The four electrode switch illustrated is very convenient and is a preferred form.

I claim:

1. In a level switch comprising a curved switch body partially filled with a solution of an electrolyte in ionizing solvents containing at least one component which on electrolysis sets free hydrogen, the amount of the electrolyte solution being sufficient to permit formation of a gas bubble and electrodes from a plurality of circuits extending into the bubble at balance but at least one of the electrodes being wetted by the electrolyte solution when the switch is tilted, the improvement which comprises a thinly fluid dispersion in the electrolyte of at least five percent of a hydrogen acceptor, the hydrogen acceptor reacting with hydrogen to form a compound which remains thinly fluidly dispersed in the electrolyte.

2. A switch according to claim 1 in which the hydrogen acceptor is an unsaturated organic solvent and there is present a hydrogenation catalyst.

3. A switch according to claim 2 in which the electrolyte is an aqueous alcoholic solution of a soluble halide.

4. A switch according to claim 3 in which the electrolyte is an alkali metal iodide dissolved in aqueous lower alkanol and the unsaturated component is unsaturated alcohol.

5. A switch according to claim 4 in which the unsaturated alcohol is allyl alcohol.

References Cited in the file of this patent

UNITED STATES PATENTS

| | | |
|---|---|---|
| 2,338,811 | Hasbrook | Jan. 11, 1944 |
| 2,387,313 | Wilson | Oct. 23, 1945 |
| 2,720,569 | Schoeppel et al. | Oct. 11, 1955 |

Notice of Adverse Decision in Interference

In Interference No. 91,322 involving Patent No. 2,927,987, H. B. Uhl, Level switches, final judgment adverse to the patentee was rendered May 24, 1962, as to claims 1, 2, 3, 4 and 5.

[*Official Gazette August 25, 1964.*]